(12) United States Patent
Rösel et al.

(10) Patent No.: US 8,312,707 B2
(45) Date of Patent: Nov. 20, 2012

(54) METHOD FOR OPERATING AN EXHAUST-GAS CATALYTIC CONVERTER OF AN INTERNAL COMBUSTION ENGINE

(75) Inventors: Gerd Rösel, Regensburg (DE); Michaela Schneider, Wiesenfelden (DE)

(73) Assignee: Continental Automotive GmbH, Hannover (DE)

( * ) Notice: Subject to any disclaimer, the term of this patent is extended or adjusted under 35 U.S.C. 154(b) by 893 days.

(21) Appl. No.: 12/161,264

(22) PCT Filed: Dec. 5, 2006

(86) PCT No.: PCT/EP2006/069323
§ 371 (c)(1),
(2), (4) Date: Jul. 17, 2008

(87) PCT Pub. No.: WO2007/087920
PCT Pub. Date: Aug. 9, 2007

(65) Prior Publication Data
US 2010/0186371 A1 Jul. 29, 2010

(30) Foreign Application Priority Data
Jan. 17, 2006 (DE) .................. 10 2006 002 257

(51) Int. Cl.
*F01N 3/00* (2006.01)
*F01N 3/10* (2006.01)

(52) U.S. Cl. ............... 60/277; 60/274; 60/286; 60/301
(58) Field of Classification Search ............ 60/274, 60/297, 277, 301
See application file for complete search history.

(56) References Cited

U.S. PATENT DOCUMENTS

| | | | | |
|---|---|---|---|---|
| 5,417,060 A | * | 5/1995 | Ishida et al. | 60/276 |
| 5,535,135 A | * | 7/1996 | Bush et al. | 702/24 |
| 6,003,307 A | * | 12/1999 | Naber et al. | 60/274 |
| 6,263,668 B1 | * | 7/2001 | Yamashita et al. | 60/301 |
| 6,539,705 B2 | * | 4/2003 | Beer et al. | 60/274 |
| 7,059,121 B2 | | 6/2006 | Coillard | 60/295 |
| 2003/0056495 A1 | * | 3/2003 | Lewis et al. | 60/277 |
| 2003/0056496 A1 | * | 3/2003 | Ueno et al. | 60/277 |
| 2003/0061803 A1 | * | 4/2003 | Iihoshi et al. | 60/285 |
| 2003/0115854 A1 | * | 6/2003 | Tamura et al. | 60/277 |
| 2003/0131587 A1 | * | 7/2003 | Kawamura | 60/276 |
| 2003/0182050 A1 | * | 9/2003 | Maegawa et al. | 701/114 |
| 2003/0221415 A1 | * | 12/2003 | Rosel et al. | 60/277 |
| 2004/0226281 A1 | * | 11/2004 | Coillard | 60/276 |
| 2005/0284130 A1 | * | 12/2005 | Takubo et al. | 60/285 |

FOREIGN PATENT DOCUMENTS
DE 4005803 8/1990

OTHER PUBLICATIONS
International Search Report and Written Opinion; PCT/EP2006/069323; pp. 10, Apr. 20, 2007.

* cited by examiner

*Primary Examiner* — Kenneth Bomberg
*Assistant Examiner* — Dapinder Singh
(74) *Attorney, Agent, or Firm* — King & Spalding L.L.P.

(57) ABSTRACT

Method and apparatus for operating an exhaust-gas catalytic converter (21) of an internal combustion engine having at least one cylinder (Z1-Z4) and one exhaust-gas section (4), in which the exhaust-gas catalytic converter (21) and a lambda probe (43) downstream of the exhaust-gas catalytic converter (21) are arranged. A characteristic value which is representative for the NOx concentration is determined as a function of a measured signal (VLS DOWN) of the lambda probe (43).

10 Claims, 7 Drawing Sheets

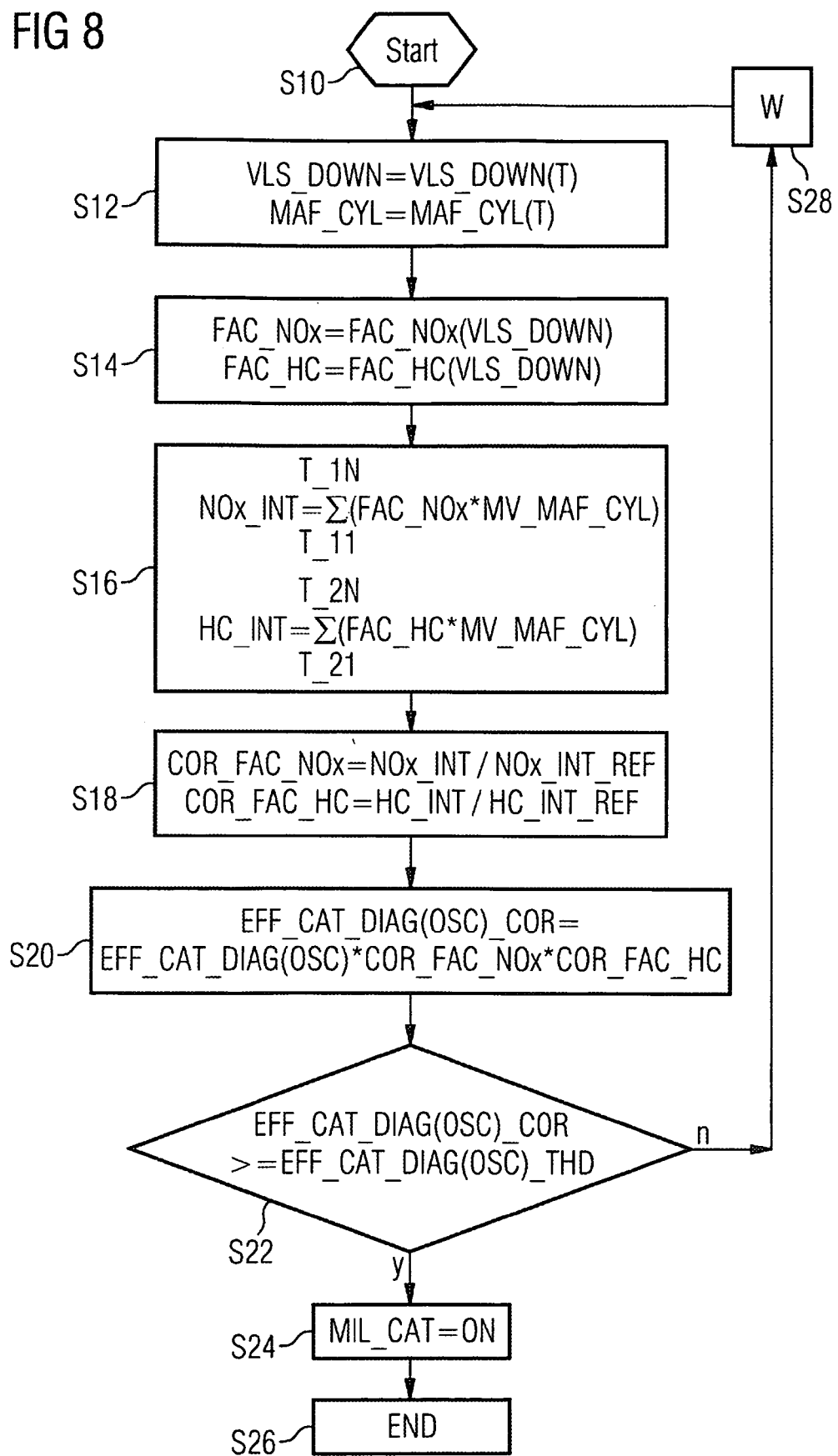

METHOD FOR OPERATING AN EXHAUST-GAS CATALYTIC CONVERTER OF AN INTERNAL COMBUSTION ENGINE

CROSS-REFERENCE TO RELATED APPLICATIONS

This application is a U.S. national stage application of International Application No. PCT/EP2006/069323 filed Dec. 5, 2006, which designates the United States of America, and claims priority to German application no. 10 2006 002 257.2 filed Jan. 17, 2006, the contents of which are incorporated by reference in their entirety.

TECHNICAL FIELD

The invention relates to a method for operating an exhaust-gas catalytic converter of an internal combustion engine.

BACKGROUND

Increasingly strict legal requirements regarding the permissible pollutant emissions from motor vehicles in which internal combustion engines are fitted make it necessary to keep the emission of pollutants as low as possible during the operation of internal combustion engines. On the one hand, this can be achieved by reducing the pollutant emissions that are generated during the combustion of the air/fuel mixture in each cylinder of the internal combustion engine. On the other hand, exhaust-gas aftertreatment systems are used in internal combustion engines to convert the pollutant emissions that are generated during the combustion of the air/fuel mixture in each cylinder into harmless substances. In petrol engines in particular, three-way catalytic converters are used for this purpose as exhaust-gas catalytic converters. In order to achieve a high level of efficiency in the conversion of the pollutants, such as carbon monoxide, hydrocarbons and nitrogen oxides, the fuel/air ratio in the cylinders must be precisely set. Furthermore, the mixture must exhibit a predetermined fluctuation upstream of the catalytic converter, i.e. a specific operation of the internal combustion engine is required when there is both a lean mixture and a rich mixture in order to bring about the filling and emptying of an oxygen tank of the exhaust-gas catalytic converter. As oxygen is taken in, nitrogen oxides in particular are reduced, whereas as it is expelled oxidation is encouraged and furthermore the deactivation of portions of the exhaust-gas catalytic converter by stored oxygen molecules is prevented.

As already mentioned, a three-way catalytic converter can only convert pollutants optimally if the fuel/air ratio $\lambda$ is within a range around $\lambda=1$. The reason for this is that only fuel/air ratios of this type generate an exhaust-gas composition in which the oxygen that is released during the reduction of the nitrogen oxides is sufficient to nearly completely oxidize the HC and CO proportions of the exhaust-gas to $CO_2$ and $H_2O$. In an internal combustion engine with a three-way catalytic converter, the mixture generation is therefore regulated to a nominal value of $\lambda \approx 1$ by a so-called lambda control. In order to compensate for short-term fluctuations in the fuel/air ratio, the catalytic converter also contains a layer which can store oxygen for a short time and either bind it or release it as required.

In the reference book "Handbuch Verbrennungsmotoren", ed. Richard von Basshuysen/Fred Schäfer, $2^{nd}$ edition, June 2002, Friedrich Vieweg & Sohn Verlagsgesellschaft mbH, Brunswick/Wiesbaden, page 641 ff., an exhaust-gas aftertreatment system for an internal combustion engine, specifically a petrol engine, is described with a three-way catalytic converter with regulation of the air/fuel ratio $\lambda=1$ and an oxygen tank with a catalytic coating with cerium, which possesses the property of being able to store oxygen and release it again.

In order to ensure that the maximum pollutant emissions that have been appropriately predetermined are not exceeded, legal regulations require the frequent diagnosis of components of the exhaust-gas tract of the internal combustion engine. The oxygen storage capacity of the exhaust-gas catalytic converter must be diagnosed in this way for example.

The oxygen storage capacity of the catalytic converter is tested using so-called OSC catalytic converter diagnostics (OSC=oxygen storage capacity). A rich/lean oscillation of the mixture is effected by pre-controlling the lambda regulation. The oscillation is compensated for by the oxygen storage capacity of the catalytic converter if the latter is in good order. The signal from the lambda sensor that is arranged downstream of the catalytic converter will only exhibit an oscillation with a small amplitude in this case. If the catalytic converter has aged, its oxygen storage capacity will be reduced and the signal from the lambda sensor downstream from the catalytic converter will exhibit a clear oscillation in response to the stimulus of a rich/lean oscillation at the catalytic converter inlet.

SUMMARY

A method and a device for operating an exhaust-gas catalytic converter of an internal combustion engine can be created which enables operation with very low pollutant emissions.

According to an embodiment, a method for operating an exhaust-gas catalytic converter of an internal combustion engine with at least one cylinder and an exhaust-gas tract, in which the exhaust-gas catalytic converter and a lambda sensor downstream of the exhaust-gas catalytic converter are arranged, may comprise the step of determining a characteristic value that is representative of the NOx concentration as a function of a measured signal of the lambda sensor.

According to another embodiment, a device for operating an exhaust-gas catalytic converter of an internal combustion engine may comprise at least one cylinder and an exhaust-gas tract, wherein the exhaust-gas catalytic converter and a lambda sensor are arranged downstream of the exhaust-gas catalytic converter, the device being operable to—determine a characteristic value as a function of a measured signal of the lambda sensor that is representative of the NOx concentration.

According to a further embodiment, the method may further comprise the step of determining a characteristic value that is representative of the HC concentration as a function of a measured signal of the lambda sensor. According to a further embodiment, the characteristic value for the NOx concentration may be a NOx factor that is determined from a first characteristic curve as a function of the measured signal and that is constant in sections of the first characteristic curve. According to a further embodiment, the characteristic value for the HC concentration may be an HC factor that is determined from a second characteristic curve as a function of the measured signal and that is constant in sections (VLS_DOWN_21-VLS_DOWN_2N) of the second characteristic curve. According to a further embodiment, in the method, in periods of time in which the relevant NOx factor is constant, the relevant NOx factor may be multiplied by a mean value of an air-mass flow into the cylinders in order to obtain a measurement for the NOx emissions in the periods of time, and the measurement for the NOx emission may be determined from the sum of the NOx emissions in the periods of time.

According to a further embodiment, in the method, in the periods of time in which the relevant HC factor is constant, the relevant HC factor may be multiplied by mean values of the air-mass flow into the cylinders in order to obtain a measurement for the HC emissions in the periods of time, and the measurement for the HC emission may be determined from the sum of the HC emissions in the periods of time.

BRIEF DESCRIPTION OF THE DRAWINGS

Exemplary embodiments of the invention are described in more detail below with reference to the schematic drawings, in which;

FIG. 8 shows a flow chart of a further program that is executed in the control device.

Elements with the same construction or function are indicated with the same reference numerals in all figures.

DETAILED DESCRIPTION

Figure 1:
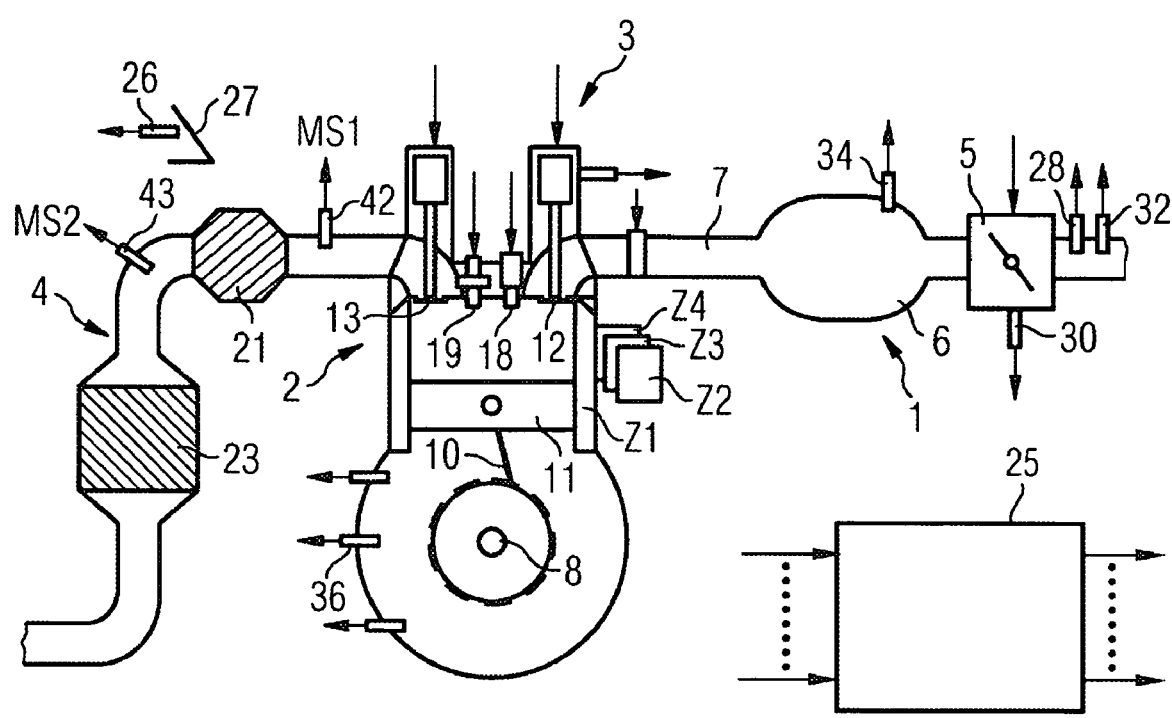
FIG. 1 shows an internal combustion engine with a control device.

According to various embodiments, in a method and an appropriate device for operating an exhaust-gas catalytic converter of an internal combustion engine with at least one cylinder and an exhaust-gas tract, in which the exhaust-gas catalytic converter and a lambda sensor downstream of the exhaust-gas catalytic converter are arranged, a characteristic value which is representative of the NOx concentration is determined according to a measured signal from the lambda sensor.

In this way, it is possible to monitor the NOx emissions with the lambda sensor independently of the determination of the oxygen storage capacity of the catalytic converter, whereby an additional opportunity for obtaining information for analyzing the NOx emissions can be provided. As a result, a high level of reliability can be achieved in the monitoring of the components that are relevant for the emissions, in particular the catalytic converter. This is particularly relevant if there is further tightening of the exhaust-gas limit values by the legislators. The lambda sensor is preferably a binary lambda sensor, but it can also be a linear lambda sensor.

According to an embodiment, a characteristic value that is representative of the HC concentration is determined according to the measured signal from the lambda sensor. This means that the HC emissions can be monitored with the lambda sensor independently of the monitoring of the oxygen storage capacity of the catalytic converter, whereby an additional opportunity for gathering information for the qualitative analysis of the HC emissions can be provided. A very high level of reliability can be achieved for the monitoring of emission-relevant components, in particular the catalytic converter.

In a further embodiment, the characteristic value for the NOx concentration is a NOx factor that is determined from a first characteristic curve depending on the measured signal and which is constant in sections of the first characteristic curve. This means that it is very easy to determine the characteristic values of the NOx emissions.

In a further embodiment, the characteristic value for the HC concentration is a HC factor that is determined from a second characteristic curve depending on the measured signal and which is constant in sections of the second characteristic curve. This means that it is very easy to determine the characteristic values of the HC emissions.

In a further embodiment, in periods of time in which the relevant NOx factor for the NOx concentration is constant, the relevant NOx factor for the NOx concentration is multiplied by an average of an air-mass flow into the cylinders in order to obtain a relevant measurement for the NOx emissions in the periods of time. Furthermore, the measurement for the NOx emission is determined from the sum of the NOx emissions in the periods of time. This method allows the NOx emissions to be easily calculated.

In a further embodiment, in periods of time in which the relevant HC factor for the HC concentration is constant, the relevant HC factor for the HC concentration is multiplied by averages of the air-mass flow into the cylinders in order to obtain a measurement for HC emissions in the periods of time and the measurement for the HC emission is determined from the sum of the HC emissions in the periods of time. This method allows the HC emissions to be easily calculated.

FIG. 1 shows an internal combustion engine with an inlet tract 1, an engine block 2, a cylinder head 3 and an exhaust-gas tract 4. The inlet tract 1 preferably comprises a throttle valve 5, a manifold 6, and an inlet pipe 7. The inlet pipe 7 is routed into the engine block 2 as far as a cylinder Z1 at the inlet port. The engine block 2 comprises a crankshaft 8 which is coupled to a piston 11 of the cylinder Z1 by means of a connecting rod 10.

The cylinder head 3 comprises a valve mechanism with a gas inlet valve 12 and a gas outlet valve 13. The cylinder head 3 further comprises a fuel injection valve 18 and a spark plug 19. Alternatively, the fuel injection valve 18 can also be arranged in the inlet pipe 7.

In the exhaust-gas tract 4, there is an exhaust-gas catalytic converter 21 that is configured as a three-way catalytic converter. Furthermore, an additional exhaust-gas catalytic converter 23 that is preferably configured as a NOx catalytic converter can preferably also be provided in the exhaust-gas tract.

The internal combustion engine also has a control device 25 with sensors that can record various measured variables and determine the value of each measured variable. According to at least one of the measured variables, the control device 25 determines actuating variables which can then be converted into one or more actuating signals to control the actuating elements by means of appropriate actuating drives. The control device 25 can also be identified as a device for operating the internal combustion engine.

The sensors comprise a pedal position sensor 26 that records an accelerator pedal position of an accelerator pedal 27. The internal combustion engine also has an air-mass sensor 28 that is arranged upstream of the throttle valve 5, where it records an air-mass flow. A temperature sensor 32 upstream of the throttle valve 5 records an inlet-air temperature. An inlet pipe pressure sensor 34 downstream of the throttle valve 5 is arranged in the manifold 6 and records an inlet pipe pressure in the manifold 6. Furthermore, the internal combustion engine comprises a crankshaft angle sensor 36 that records a crankshaft angle to which a speed of the internal combustion engine can be assigned.

Upstream of the exhaust-gas catalytic converter 21, there is an exhaust-gas sensor 42 that records the residual oxygen content of the exhaust-gas and the measured signal of which is characteristic of the air/fuel ratio in the combustion chamber of the cylinder Z1 and upstream of the exhaust-gas sensor 42 before the oxidation of the fuel. Furthermore, there is a lambda sensor 43 that is arranged downstream of the exhaust-gas catalytic converter 21 and that records the residual oxygen content of the exhaust-gas and the measured signal VLS_DOWN of which is characteristic of the fuel/air ratio in the combustion chamber of the cylinder Z1 and upstream of the lambda sensor 43 before the oxidation of the fuel.

The exhaust-gas sensor 42 is preferably a binary lambda sensor. The lambda sensor 43 is also preferably a binary lambda sensor. However, the exhaust-gas sensor 42 and/or the lambda sensor 43 can essentially also be configured as a linear lambda sensor.

According to an embodiment, any subset of the sensors mentioned may be present, or there may also be additional sensors.

The actuating elements are for example the throttle valve 5, the gas inlet and outlet valves, 12, 13, the fuel injection valve 18 or the spark plugs 19.

Next to the cylinder Z1, there are preferably further cylinders Z2 to Z4, to which appropriate actuating elements and possibly sensors are assigned.

Figure 2:
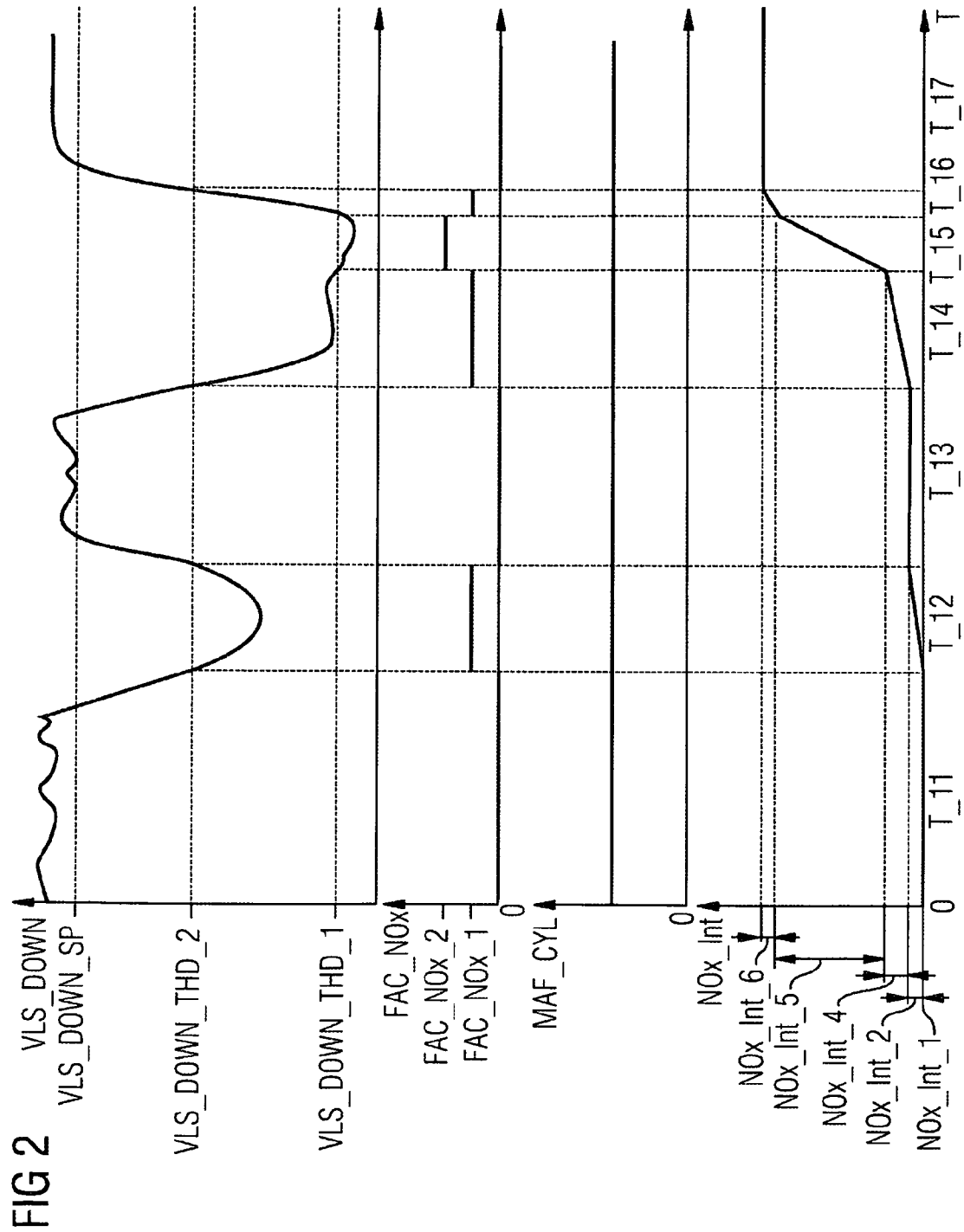
FIG. 2 shows a representation of a method for determining the measurement for NOx emissions.
Figure 3:
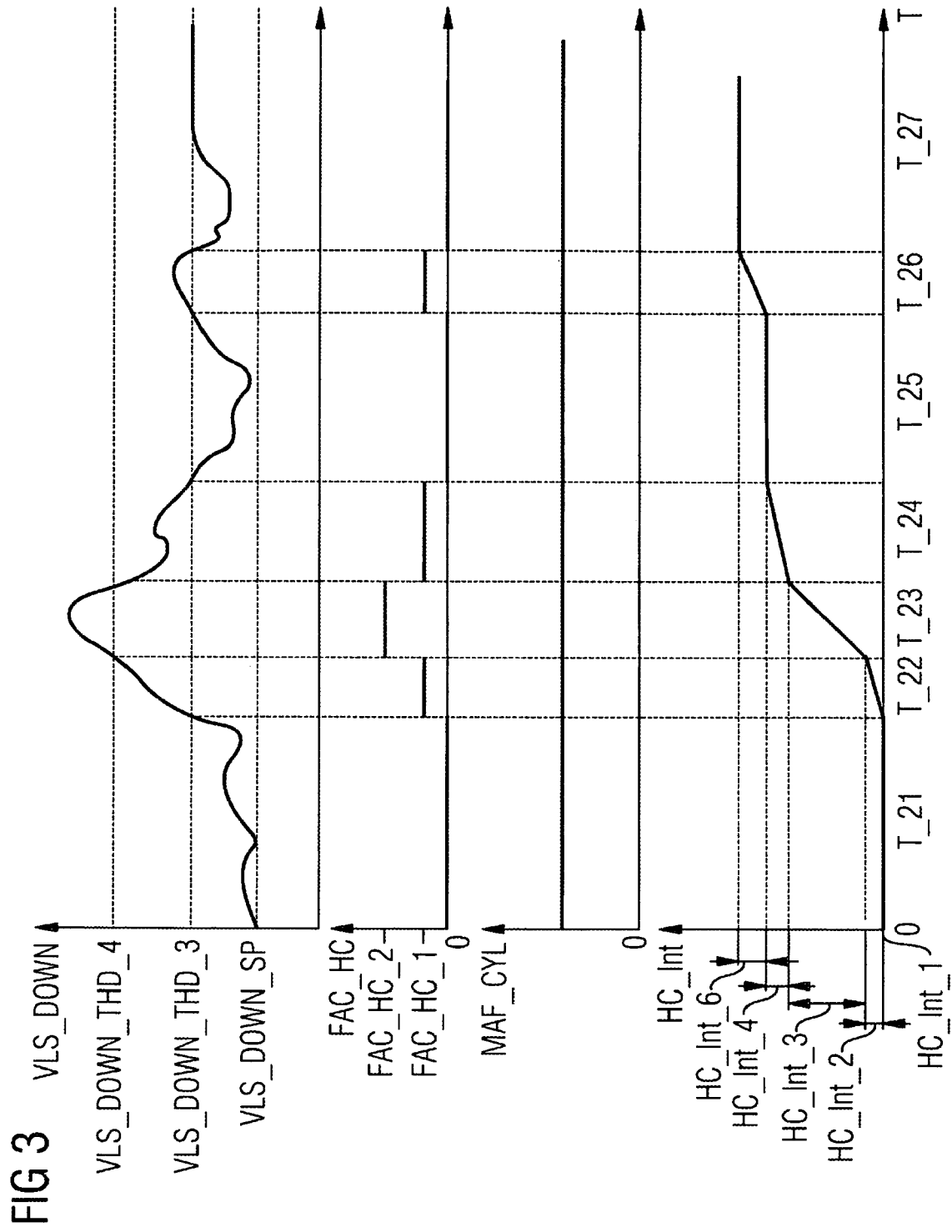
FIG. 3 shows a representation of a method for determining a measurement for HC emissions.

FIGS. 2 and 3 show the signal waveforms VLS_DOWN at the lambda sensor 43, the signal waveform of an air-mass flow MAF_CYL into the cylinders, a waveform of a NOx factor FAC_NOx for the NOx concentration or of an HC factor FAC_HC for the HC concentration respectively, and a waveform for a measurement NOx_INT for the NOx emission or a waveform for a measurement HC_INT for the HC emission respectively.

FIG. 2 shows a characteristic waveform of the measured signal VLS_DOWN of the lambda sensor 43. For $\lambda=1$, the measured signal VLS_DOWN should essentially reach a nominal value VLS_DOWN_SP of the measured signal of the lambda sensor 43. If the exhaust-gas mixture becomes leaner, the measured signal VLS_DOWN of the lambda sensor 43 will diverge from the nominal value VLS_DOWN_SP of the measured signal of the lambda sensor 43 towards smaller values. It can be assumed from this that more NOx emissions are being released. In order to obtain characteristic values that are each representative of the NOx concentration, threshold values VLS_DOWN_THD_1 and VLS_DOWN_THD_2 are specified, to which specific values for the NOx factor FAC_NOx for the NOx concentration are assigned if these threshold values are dropped below.

FIG. 3 shows that, if the exhaust-gas mixture becomes richer, the measured signal VLS_DOWN of the lambda sensor 43 diverges from the nominal value VLS_DOWN_SP of the measured signal of the lambda sensor 43 towards larger values. In this case, it can be assumed that more HC emissions are being released. In order to obtain characteristic values that are representative of the HC concentration in each case, threshold values VLS_DOWN_THD_3 and VLS_DOWN_THD_4 are specified, to which specified values are assigned for the HC factor FAC_HC for the HC concentration if these threshold values are dropped below.

Figure 4:
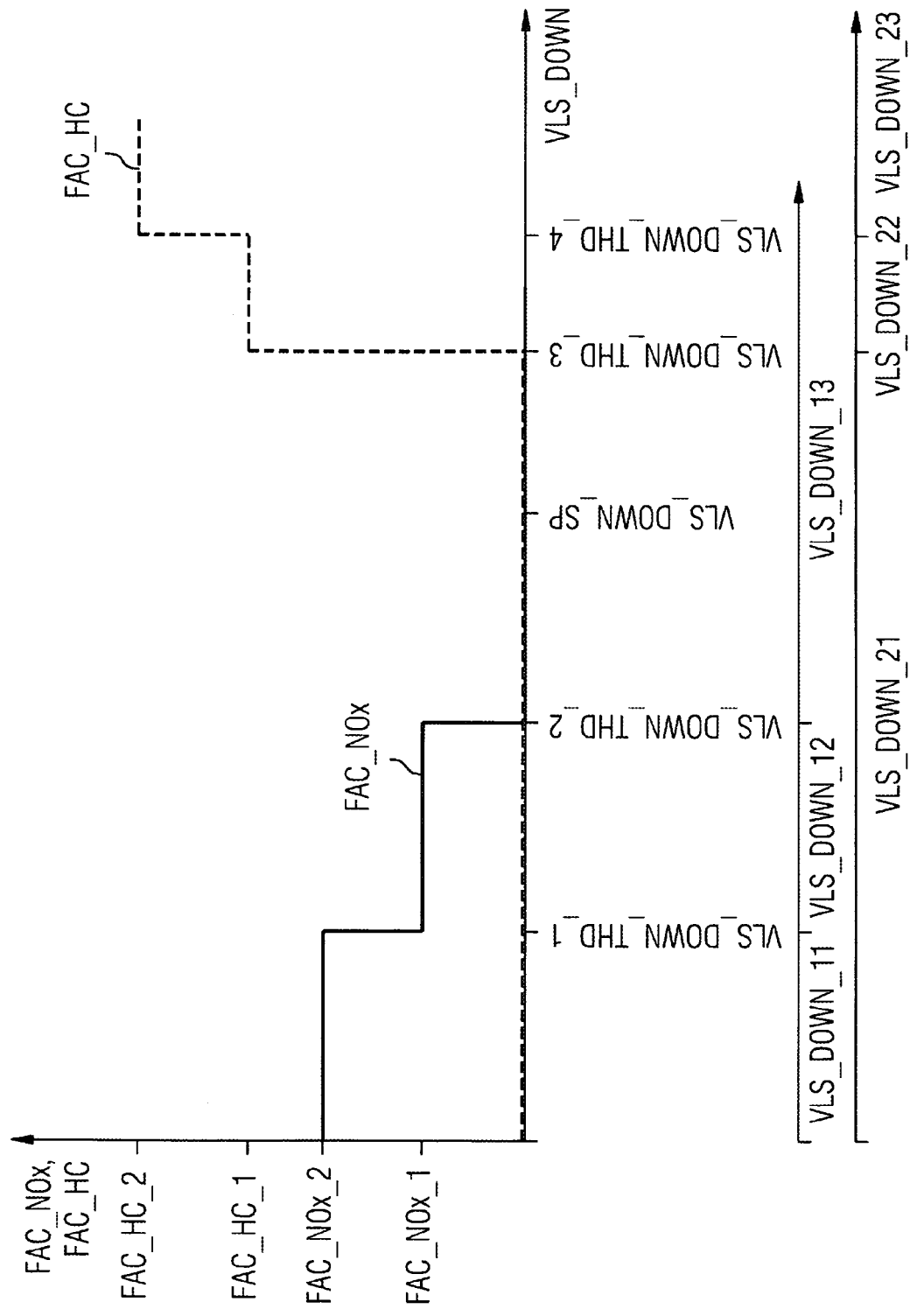
FIG. 4 shows the progression of a HC and a NOx factor depending on a progression of a measured signal of a lambda sensor.

The functional relationship between the NOx factor FAC_NOx for the NOx concentration or the HC factor FAC_HC for the HC concentration and the measured signal VLS_DOWN of the lambda sensor 43 is plotted in FIG. 4. In a measured signal range VLS_DOWN_11 of the lambda sensor 43, i.e. a value of the measured signal VLS_DOWN of the lambda sensor 43 between zero and a threshold value VLS_DOWN_THD_1 of the measured signal of the lambda sensor 43, the NOx factor FAC_NOx for the NOx concentration has a value of FAC_NOx_2. Between the threshold value VLS_DOWN_THD_1 and the threshold value VLS_DOWN_THD_2 of the measured signal of the lambda sensor 43, the NOx factor FAC_NOx for the NOx concentration has a value of FAC_NOx_1. If the value of the measured signal VLS_DOWN of the lambda sensor 43 is greater than a threshold value VLS_DOWN_THD_2, the value of the NOx factor FAC_NOx for the NOx concentration is equal to zero.

If the value of the measured signal VLS_DOWN of the lambda sensor 43 is in a range VLS_DOWN_21, i.e. between zero and a threshold value VLS_DOWN_THD_3 of the measured signal of the lambda sensor 43, the HC factor FAC_HC for the HC concentration is equal to zero. In a further measured signal range VLS_DOWN_22, i.e. between the threshold values VLS_DOWN_THD_3 and VLS_DOWN_THD_4 of the measured signal range of the lambda sensor 43, the HC factor FAC_HC for the HC concentration has a value of FAC_HC_1. In a measured signal range VLS_DOWN_23 of the lambda sensor 43, i.e. if the measured signal value VLS_DOWN of the lambda sensor 43 is greater than a threshold value VLS_DOWN_THD_4, the HC factor FAC_HC for the HC concentration has a value of FAC_HC_2.

Preferably, the threshold value VLS_DOWN_THD_1 of the measured signal of the lambda sensor 43 has a value of about 150 mV, the threshold value VLS_DOWN_THD_2 of the measured signal of the lambda sensor 43 has a value of about 300 mV, the threshold value VLS_DOWN_THD_3 of the measured signal of the lambda sensor 43 has a value of about 780 mV, and the threshold value VLS_DOWN_THD_4 of the measured signal of the lambda sensor 43 has a value of about 810 mV. Furthermore, it is preferable if the nominal value VLS_DOWN_SP of the measured signal of the lambda sensor 43 has a value of approximately 700 mV. Depending on the application, the values for the threshold values VLS_DOWN_THD and the nominal value VLS_DOWN_SP of the measured signal of the lambda sensor 43 can also be different values.

The number of threshold values VLS_DOWN_THD of the measured signal of the lambda sensor 43 can vary according to the application, i.e. the number may differ and be smaller or greater than the four threshold values of the measured signal of the lambda sensor 43 specified here.

FIG. 2 shows that in each of the periods of time T_11 to T_17, the NOx factor FAC_NOx_1 to FAC_NOx_2 for the NOx concentration is constant. Each NOx factor FAC_NOx_1 to FAC_NOx_2 for the NOx concentration is multiplied by an air-mass flow MAF_CYL into the cylinders, which has been set as constant here. This gives a measurement for NOx emissions NOx_INT_1 to NOx_INT_7 in each of the periods of time T_11 to T_17. The summation of the NOx emissions NOx_INT_1 to NOx_INT_7 in the periods of time T_11 to T_17 finally gives the measurement for the NOx emission NOx_INT, as can be seen in the bottom curve progression in FIG. 2.

Accordingly, as shown in FIG. 3, in the periods of time T_21 to T_27 in which the relevant HC factor FAC_HC_1 to FAC_HC_2 for the HC concentration is constant, the relevant HC factor FAC_HC_1 to FAC_HC_2 for the HC concentration is multiplied by air-mass flow MAF_CYL into the cylinders, which is set as constant here. The multiplication gives a measurement for HC emissions HC_INT_1 to HC_INT_7 in the periods of time T_21 to T_27. The summation of the HC emissions HC_INT_1 to HC_INT_7 in the periods of time T_21 to T_27 allows the measurement of HC emissions HC_INT to be determined, as shown in the bottom curve in FIG. 3. In this way, a very easy method for calculating the HC and NOx emissions is provided.

It should be noted that in the following description of pollutant emissions according to FIGS. 5 and 6, only the variation of one pollutant is assumed for each depiction, i.e. NOx in FIG. 5 and HC in FIG. 6. Other pollutants behave neutrally in relation to each curve progression.

If, in relation to a reference value NOx_INT_REF for the measurement of NOx emissions that is just within permissible limits or in relation to a reference value HC_INT_REF for the measurement of HC emissions that is just within permissible limits, whereby the reference value NOx_INT_REF is the measurement for the NOx emission and the reference value HC_INT_REF is the measurement for the HC emission, the measurement NOx_INT for the NOx emission and HC_INT for the HC emission respectively are each used as values for an OBD threshold catalyst (OBD=onboard diagnostics), valuation factors COR_FAC_NOx, COR_FAC_HC can be obtained for the NOx concentration and the HC concentration respectively. For a catalyst with emission characteristics that correspond to the OBD threshold catalyst, i.e. for NOx_INT/NOx_INT_REF=1 or HC_INT/HC_INT_REF=1, as shown in FIGS. 5 and 6, in a catalyst oxygen-storage diagnostic result EFF_CAT_DIAG(OSC), an emission of HC or NOx is achieved at a threshold EFF_CAT_DIAG(OSC)_THD of the catalyst oxygen-storage diagnostic result that corresponds to the reference value HC_INT_REF for the measurement of HC emissions that is just within permissible limits or the reference value NOx_INT_REF for the measurement of NOx emissions that is just within permissible limits. The threshold value EFF_CAT_DIAG(OSC)=0 of the catalyst oxygen-storage diagnostic result corresponds to a brand-new catalytic converter. Increased catalyst oxygen-storage diagnostic results EFF_CAT_DIAG(OSC) correspond to the increased aging of the catalytic converter.

Multiplication of the catalyst oxygen-storage diagnostic result EFF_CAT_DIAG(OSC) by the valuation factor COR_FAC_NOx for the NOx concentration and the valuation factor COR_FAC_HC for the HC concentration gives a corrected catalyst oxygen-storage diagnostic result EFF_CAT_DIAG(OSC)_COR.

Figure 5:
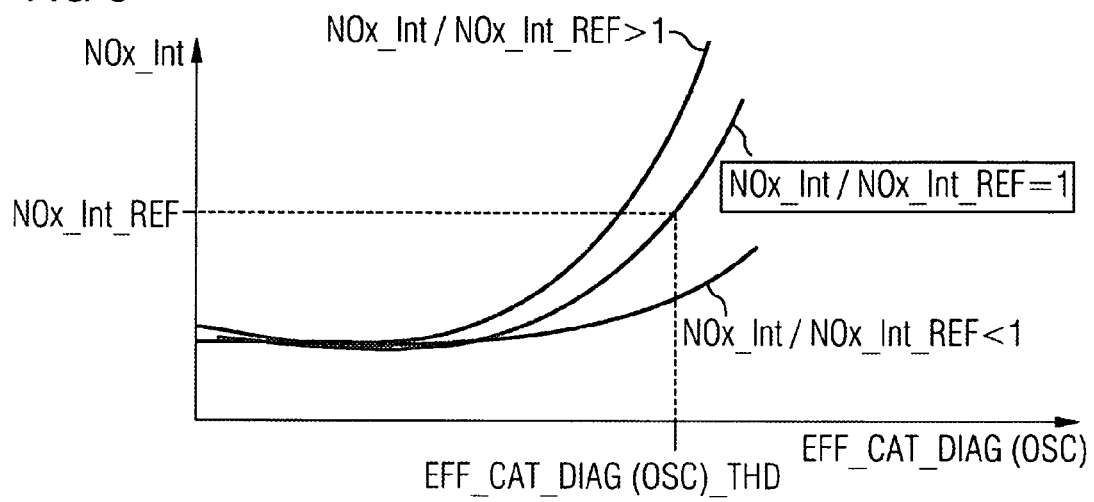
FIG. 5 shows a progression of the measurement of the NOx emissions as a function of a catalyst oxygen-storage diagnostic result.

FIG. 5 shows the progression of the NOx emission as a function of the catalyst oxygen-storage diagnostic result EFF_CAT_DIAG(OSC). For NOx_INT/NOx_INT_REF<1, the reference value NOx_INT_REF for the measurement of the NOx emissions that is just within permissible limits is not reached until there is a greater catalyst oxygen-storage diagnostic result. For NOx_INT/NOx_INT_REF>1, on the other hand, the critical value NOx_INT_REF for the measurement of the NOx emissions that is just within permissible limits is reached already when there is a smaller catalyst oxygen-storage diagnostic result EFF_CAT_DIAG(OSC).

Figure 6:
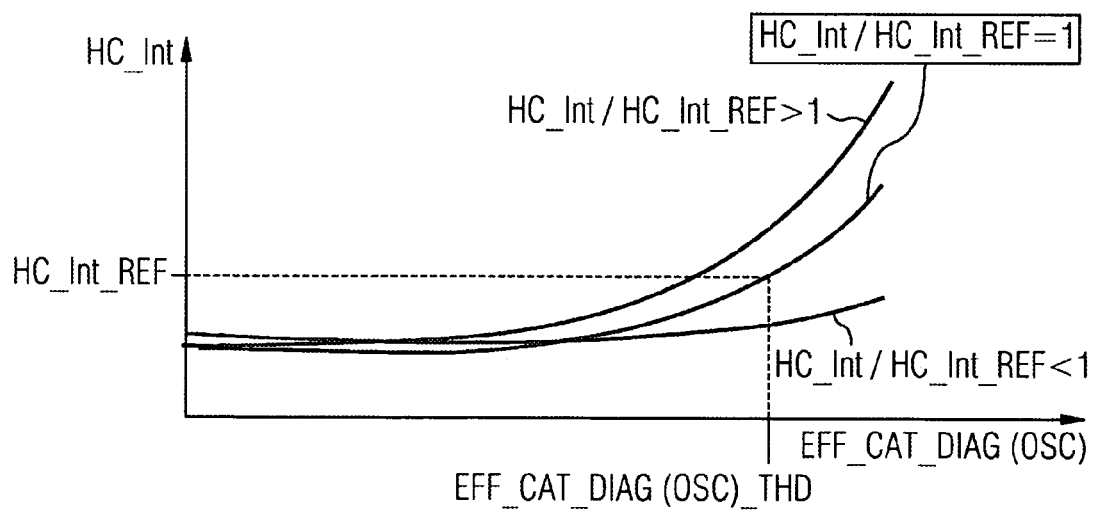
FIG. 6 shows a progression of the measurement for the HC emission as a function of the catalyst oxygen-storage diagnostic result.

FIG. 6 shows the corresponding behavior of HC as a function of the catalyst diagnostic result. For HC_INT/HC_INT_REF<1, the reference value HC_INT_REF for the measurement of the HC emissions that is just within permissible limits is not reached until there is a greater catalyst oxygen-storage diagnostic result EFF_CAT_DIAG(OSC). For HC_INT/HC_INT_REF>1, the critical value for the reference value HC_INT_REF for the measurement of the HC emissions that is just within permissible limits is already reached at a smaller catalyst oxygen-storage diagnostic result EFF_CAT_DIAG(OSC).

For the operation of the exhaust-gas catalytic converter 21 of the internal combustion engine, a program can be stored in a program memory of the control device 25 and executed during the operation of the internal combustion engine. The program can be used to determine measurements for the NOx and HC emissions and a fault indicator for the catalytic converter can be triggered.

The program is started in a step S10 (FIGS. 7 and 8), in which variables are initialized as appropriate. The start preferably takes place when current information about the status of the exhaust-gas catalytic converter 21 is to be determined. This can be while the engine is running or at predetermined fixed intervals or after a definable distance driven.

In a step S12, the time-related value T of the measured signal VLS_DOWN of the lambda sensor 43 and the time-dependent value of the air-mass flow MAF_CYL into the cylinders are determined.

In a step S14, the NOx factor FAC_NOx for the NOx concentration and the HC factor FAC_HC for the HC concentration are determined as a function of the measured signal VLS_DOWN of the lambda sensor 43, as has already been described in detail in the description of FIGS. 2 to 4.

Figure 7:
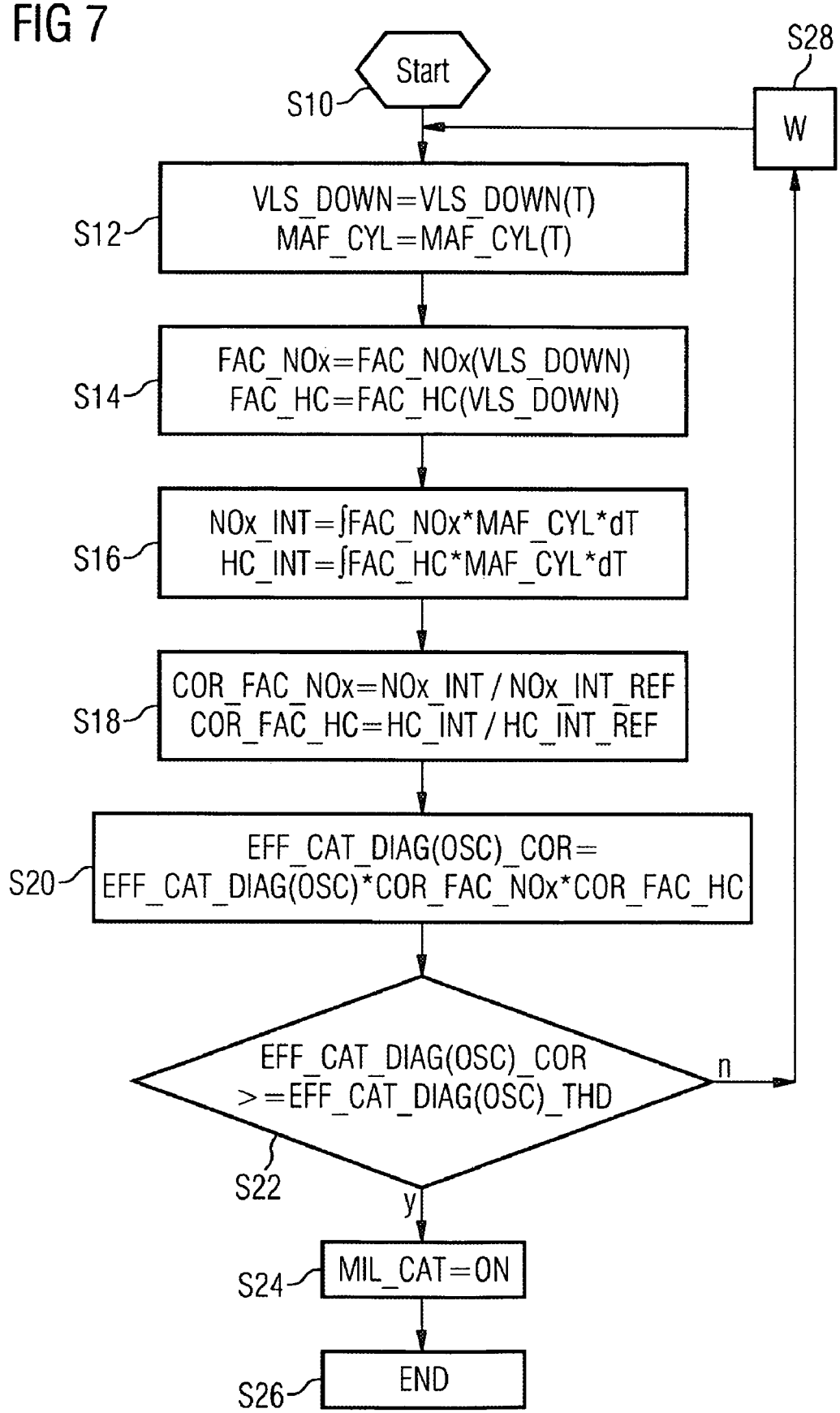
FIG. 7 shows a flow chart of a program that is executed in the control device.

In a step S16, the measurement NOx_INT for the NOx emission and the measurement HC_INT for the HC emission are determined. For this, a time integral over the product of the NOx factor FAC_NOx for the NOx concentration and the air-mass flow MAF_CYL into the cylinders is calculated. The measurement HC_INT for the HC emission is expressed as a time integral over the product of the HC factor FAC_HC for the HC concentration and the air-mass flow MAF_CYL into the cylinders (FIG. 7).

As an alternative to this (FIG. 8), the measurement NOx_INT for the NOx emission can also be determined in step S16 by the creation of a mean value for the air-mass flow MAF_CYL into the cylinders during the periods of time, in which the NOx factor FAC_NOx for the NOx concentration is constant, and by a multiplication of the mean value MV_MAF_CYL by the NOx factor FAC_NOx for the NOx concentration, and by a summation of the measurements NOx_INT_n for the NOx concentration in the relevant periods of time T_11 to T_1N. Also as an alternative, the measurement HC_INT for the HC emission can be determined by the creation of the mean value MV_MAF_CYL of the air-mass flow, the multiplication by the relevant HC factors FAC_HC for the HC concentration in the relevant periods of time and a summation of the measurements HC_INT_n for the HC emission over all periods of time T_21 to T2N.

In a step S18, the valuation factor COR_FAC_NOx for the NOx concentration and the valuation factor COR_FAC_HC for the HC concentration are determined by dividing the measurement NOx_INT for the NOx emission by the reference value NOx_INT_REF for the measurement of the NOx emission that is just within permissible limits, and by dividing the measurement HC_INT for the HC emission by the measurement for the reference value HC_INT_REF for the measurement for the HC emission.

In a further step S20, the corrected catalyst oxygen-storage diagnostic result EFF_CAT_DIAG(OSC)_COR is determined as the product of the catalyst oxygen-storage diagnostic result EFF_CAT_DIAG(OSC) and the valuation factor COR_FAC_NOx for the NOx concentration or the valuation factor COR_FAC_HC for the HC concentration respectively.

A further step S22 checks whether the corrected catalyst oxygen-storage diagnostic result EFF_CAT_DIAG(OSC)_COR is greater than or equal to the threshold value of the catalyst oxygen-storage diagnostic result EFF_CAT_DIAG(OSC)_THD.

If this is not the case, a waiting loop W is implemented in a further step S28 until the diagnostic process is to be run again.

If the corrected catalyst oxygen-storage diagnostic result EFF_CAT_DIAG(OSC)_COR is above the threshold EFF_CAT_DIAG(OSC)_THD of the catalyst oxygen-storage diagnostic result, a fault indicator MIL_CAT for the catalytic converter is triggered in a further step S24. This fault indicator preferably takes the form of a visual or audible indicator. Alternatively or additionally, other measures can be initiated in S24.

The method is ended in a further step S26.

The invention claimed is:

1. A method for determining characteristic operating values of an exhaust-gas catalytic converter, the method comprising the step of:
   arranging a lambda sensor downstream of an exhaust-gas catalytic converter of an internal combustion engine with at least one cylinder and an exhaust-gas tract;
   receiving a measured signal from the lambda sensor;
   determining a first characteristic value that is representative of the NOx concentration as a function of the measured signal, wherein the first characteristic value for the NOx concentration is a NOx factor that is determined from a first characteristic curve as a function of the measured signal from the lambda sensor, the first characteristic curve being constant in sections of the first characteristic curve based on comparisons of the measured signal with one or more first predefined threshold values that are lower than a reference signal value;
   determining a second characteristic value that is representative of the HC concentration as a function of the measured signal, wherein the second characteristic value for the HC concentration is a HC factor that is determined from a second characteristic curve as a function of the measured signal from the lambda sensor, the second characteristic curve being constant in sections of the second characteristic curve based on comparisons of the measured signal with one or more second predefined threshold values that are higher than the reference signal value; and
   detecting a fault condition of the catalytic converter based on at least one of the NOx factor and the HC factor.

2. The method as claimed in claim 1,
   in which, in periods of time in which the relevant NOx factor is constant, the relevant NOx factor is multiplied by a mean value of an air-mass flow into the cylinders in order to obtain a measurement for the NOx emissions in the periods of time, and
   in which the measurement for the NOx emission is determined from the sum of the NOx emissions in the periods of time.

3. The method as claimed in claim 1,
   in which, in the periods of time in which the relevant HC factor is constant, the relevant HC factor is multiplied by mean values of the air-mass flow into the cylinders in order to obtain a measurement for the HC emissions in the periods of time, and
   in which the measurement for the HC emission is determined from the sum of the HC emissions in the periods of time.

4. An arrangement for determining characteristic operating values of an exhaust-gas catalytic converter of an internal combustion engine comprising at least one cylinder and an exhaust-gas tract, the arrangement comprising:
   an exhaust-gas catalytic converter and a lambda sensor arranged downstream of the exhaust-gas catalytic converter, and
   a device being operable to:
      determine a characteristic value as a function of a measured signal of the lambda sensor that is representative of the NOx concentration, wherein the first characteristic value for the NOx concentration is a NOx factor that is determined from a first characteristic curve as a function of the measured signal from the lambda sensor, the first characteristic curve being constant in sections of the first characteristic curve based on comparisons of the measured signal with one or more first predefined threshold values that are lower than a reference signal value, and
      determine a second characteristic value that is representative of the HC concentration as a function of the measured signal, wherein the second characteristic value for the HC concentration is a HC factor that is determined from a second characteristic curve as a function of the measured signal from the lambda sensor, the second characteristic curve being constant in sections of the second characteristic curve based on comparisons of the measured signal with one or more second predefined threshold values that are higher than the reference signal value; and
      detect a fault condition of the catalytic converter based on at least one of the NOx factor and the HC factor.

5. The arrangement as claimed in claim 4,
   wherein, in periods of time in which the relevant NOx factor is constant, the relevant NOx factor is multiplied by a mean value of an air-mass flow into the cylinders in order to obtain a measurement for the NOx emissions in the periods of time, and
   wherein the measurement for the NOx emission is determined from the sum of the NOx emissions in the periods of time.

6. The arrangement as claimed in claim 4,
   wherein, in the periods of time in which the relevant HC factor is constant, the relevant HC factor is multiplied by mean values of the air-mass flow into the cylinders in order to obtain a measurement for the HC emissions in the periods of time, and
   wherein the measurement for the HC emission is determined from the sum of the HC emissions in the periods of time.

7. The arrangement as claimed in claim 4,
   wherein the measurement for the NOx emission is determined from the sum of the NOx emissions in the periods of time and further divided by a reference NOx emission value corresponding to a predefined permissible NOx emission limit.

8. The arrangement as claimed in claim 7,
   wherein the measurement for the HC emission is determined from the sum of the HC emissions in the periods of time and further divided by a reference HC emission value corresponding to a predefined permissible HC emission limit.

9. The method as claimed in claim 1,
   in which the measurement for the NOx emission is determined from the sum of the NOx emissions in the periods of time and further divided by a reference NOx emission value corresponding to a predefined permissible NOx emission limit.

10. The method as claimed in claim 9, in which the measurement for the HC emission is determined from the sum of the HC emissions in the periods of time and further divided by a reference HC emission value corresponding to a predefined permissible HC emission limit.

* * * * *